United States Patent [19]

Boigenzahn et al.

[11] Patent Number: 4,945,435
[45] Date of Patent: Jul. 31, 1990

[54] NONINFLUENCING FASTENER FOR DISK DRIVES

[75] Inventors: Jeffrey F. Boigenzahn; Darrell E. Bratvold; James M. Rigotti, all of Rochester; Lyle R. Tufty, Elgin, all of Minn.

[73] Assignee: International Business Machines Corporation, Armonk, N.Y.

[21] Appl. No.: 303,792

[22] Filed: Jan. 30, 1989

[51] Int. Cl.$^5$ ............................................. G11B 5/55
[52] U.S. Cl. .................................................. 360/106
[58] Field of Search ................ 360/106, 105, 97.01, 360/98.01, 98.07, 99.08

[56] References Cited

U.S. PATENT DOCUMENTS 4,797,762  1/1989  Levy ............................. 360/106 X Primary Examiner—A. J. Heinz
Attorney, Agent, or Firm—Robert W. Lahtinen

[57] ABSTRACT

A fastening structure is provided to secure a shaft between parallel walls of a box shaped casting which will secure ans locate the shaft without inducing a distortion of the casting walls. One end of the shaft is secured to the adjacent wall and the other end of the shaft is secured through a wall opening using an annular slug and a deformable washer which is compressed by a bolt attached axially to the shaft end to cause the deformed washer to engage the surfaces defining the wall opening. The uniform axisymmetric expansion of the washer does not affect the position of the shaft and the radial fore secures the shaft end without influencing the structure of the casting.

8 Claims, 2 Drawing Sheets

NONINFLUENCING FASTENER FOR DISK DRIVES

FIELD OF THE INVENTION

The invention pertains to data storage devices and more particularly to capturing shafts about which cooperating devices such as the spindle assembly and the actuator assembly respectively rotate without influencing the walls or frame structure to which the shaft ends are attached.

BACKGROUND

In the design of hard disk files. a typical problem is encountered when the parallelism between the disk stack centerline (axis of rotation) and the head carrier (rotary actuator) centerline (pivot axis) shift relative to one another causing track misregistration (TMR). TMR may be a result of vibrations or thermally induced movements of the components. These characteristics are inherent in files using a plate type base casting design. The base casting also bends during operation of the file causing relative movement between the respective centerlines or axes of rotation of the disk stack and actuator. When the TMR is excessive, the transducer head on the most remote disk may not be properly aligned to the same cylinder as the servo head, normally positioned on the uppermost disk surface, resulting in "write fault errors".

SUMMARY

The file design of the present invention is provided to minimize TMR problems by capturing the top and bottom of the spindle shaft and the actuator shaft. This is accomplished by designing the base casting as a box shape. When the box shape is used, the relative movement between the two shafts is minimized due to the stiffness of the structure. However, the box-type design also creates a problem because the inside of the box cannot be easily machined to allow close tolerance mounting of the major components. The attachment structure and method of the present invention provides not only for the attachment of components within a box-type frame structure, but also affords a design for attaching both shaft ends to the box-type base casting structure without physical distortion of the casting structure.

DETAILED DESCRIPTION

Figure 1:
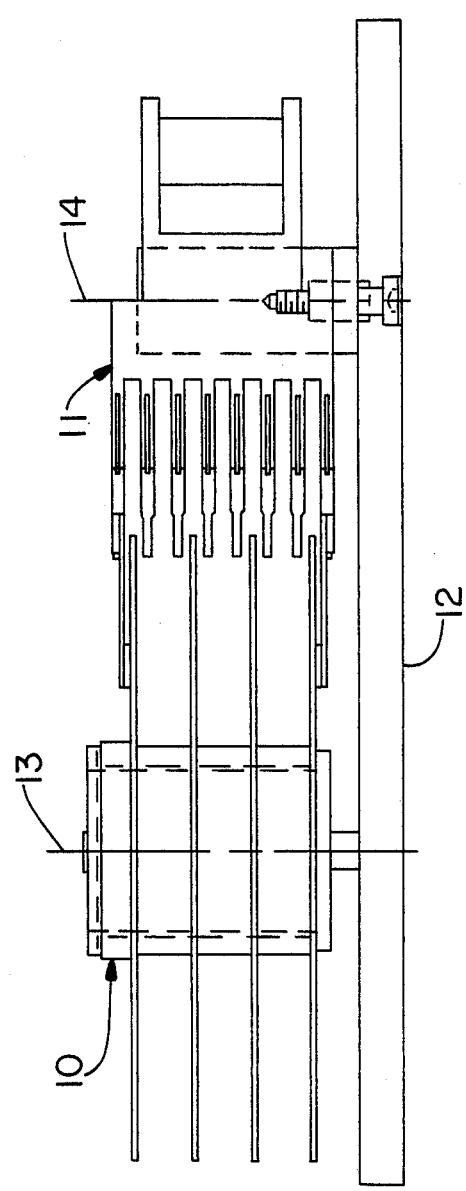
FIG. 1 is an elevation view of a prior art file design wherein the disk stack and actuator are mounted on a base plate.
Figure 3:
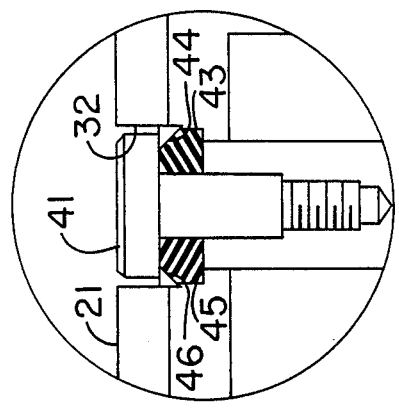
FIG. 3 is a detail showing of the noninfluencing connection at the upper end of the actuator shaft of FIG. 2.

FIG. 1 is a showing of a prior art disk file assembly wherein a disk assembly 10 and rotary actuator 11 are supported on a base casting 12. The disk assembly 10 rotates about a centerline or axis 13 and the rotary actuator pivots about the centerline or axis 14. The proper operation of the disk file is dependent upon the distance between and the parallelism of the centerlines 13 and 14. These conditions can be varied by forces applied to the base or by thermal change that induces bending of the base or non-uniform expansion. With high density storage designs wherein track densities have been increasing from 500 tracks per inch to more than 2000 tracks per inch (along with corresponding increases in the linear bit densities), the magnitude of deformation that induces errors in the reading or writing of data becomes progressively less. This is particularly true when a dedicated servo surface is used in the system and alignment of the servo head on the dedicated surface must assure that each of the data heads on the corresponding data surface is correctly aligned on the corresponding track centerline (or cylinder).

Figure 2:
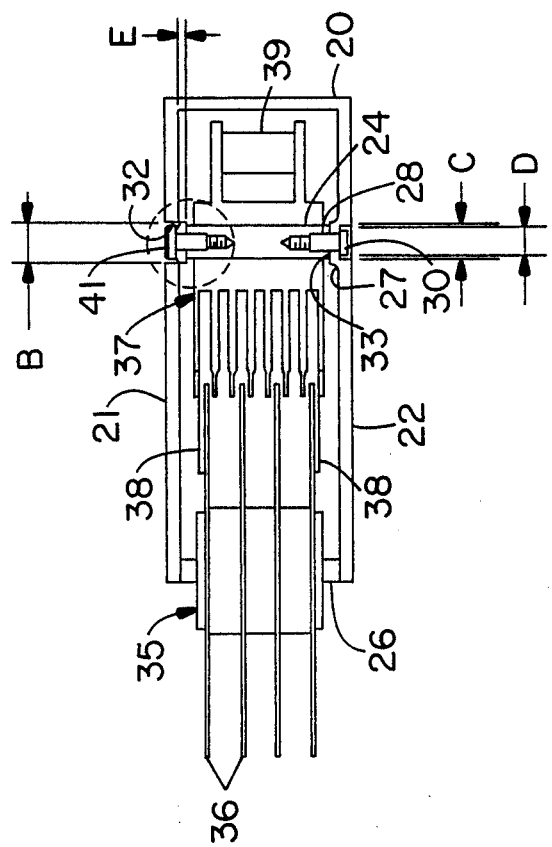
FIG. 2 is an elevation of a disk file wherein the disk stack and actuator shafts are captured at both ends using a box shaped base casting.

One method of reducing the alignment problems between the centerlines of the disk stack and actuator in a file is to use a design wherein there are plate members to support each end of the disk assembly shaft and the actuator shaft. The centerline distance and parallelism can be more accurately maintained when both ends of the pair of shafts are supported and constrained. This is most effectively accomplished using a box frame construction, as shown in FIG. 2, wherein both of the substantially parallel shaft supporting walls 21 and 22 are formed from a single piece box-type frame casting 20. A shaft 26 is captured at opposite ends by casting walls 21 and 22 respectively and supports the spindle assembly 35 that carries and rotates the data storage disks 36. The rotary actuator 37 pivots about shaft 24 and supports head suspension assemblies 38 (two of which are shown) for movement from one concentric track to another concentric track on disks 36 when driven by a voice coil 39. In a design where the shafts 24 and 26 are supported at both ends, it is also important to assure that positive attachment of the shafts 24, 26 at both ends does not induce distortion forces that are similar to the distortions that the design has sought to overcome, such as the clamping of a cover or rigid attachment of subassemblies. It is required that the shafts be confined at each end, but not influence or otherwise distort the supporting wall members 21, 22 or base structure in a manner to cause deformation.

As seen in FIG. 2, the base casting supporting wall 22 is provided with an increased thickness boss 27 through which an opening 28 is made to receive screw 30 and an enlarged counterbore C is formed to receive the head diameter D of screw 30. The spot faced surface 33 is at the inner surface of boss 27 and aligned with opening 32 in supporting wall 21. The box type design also creates a problem because both inside surfaces of the box cannot be easily machined to allow close tolerance mounting of the major components. The most accurate way to machine surfaces inside the box to mount the components is to first bore a large clearance hole 32 with bore diameter B through one side (wall 21) and then make a spot face surface 33 of the same or smaller diameter on the opposite wall. This then creates a mounting problem for the top of the rotary actuator mounting shaft. The top of the actuator shaft 24 must have enough clearance, E designed into it to allow assembly of the components. This clearance also creates a problem since there is not only a large bored hole 32 in the top of the casting, but also a significant amount of clearance E between the top of the actuator shaft and the inside surface of the casting wall. The attachment structure and method of the present invention was designed to securely fasten the top of the actuator shaft 24 without influencing (distorting) wall 21 or the structure of cast base 20.

Once the shaft 24 is attached to the bottom wall 22 of base casting 20 using a screw 30 through the counterbored clearance hole, a slug 43 with a tapered upper peripheral surface 44 is placed on top of shaft 24. Next a washer 45, made of a low yield strength metal or an elastomer, with a mating tapered surface 46 is placed over the top of slug 43. Finally, screw 41 is threaded into the top of the shaft 24 to compress the washer 45 over the tapered surface 44 of slug 43, causing the washer to expand against the surface 32 defining the base casting wall opening. This secures the top of the shaft 24 without adversely influencing the structure of the box-type base casting 20, while effectively sealing the opening through which the fastener was installed.

While the invention has been particularly shown and described with reference to a preferred embodiment thereof, it will be understood by those skilled in the art that various changes in form and details may be made therein without departing from the spirit and scope of the invention.

What is claimed is:

1. A rigid disk drive having a box frame within which a disk spindle assembly and a rotary actuator are mounted, said actuator being rotatably mounted about a shaft secured to substantially parallel walls of said box frame by connection means comprising
   first securing means securing one end of said shaft to one of said substantially parallel walls;
   a surface defining an opening in the other of said substantially parallel walls; and
   second securing means at said other substantially parallel wall including a deformable washer disposed in said wall opening and compressive retaining means connected to said shaft which compresses and deforms said deformable washer into contact with said wall surface defining an opening, whereby said shaft is retained at the end opposite said one end to said substantially parallel wall without applying a force that urges said substantially parallel wall portions toward or away from one another.

2. The rigid disk drive of claim 1, wherein said second securing means further comprises an annular slug member with a frusto conical peripheral surface acing away from the end of said shaft end opposite said one end and said deformable washer has a mating frusto conical inner surface that engages said slug frusto conical surface.

3. The rigid disk drive of claim 2 wherein said compressive retaining means comprises a bolt which is received in a threaded axial opening in the end of said shaft.

4. The rigid disk drive of claim 3 wherein said deformable washer is formed of one of a low yielding metal or an elastomer.

5. The rigid disk drive of claim 4 wherein said first securing means comprises a second opening in said one substantially parallel wall, a faced surface on said wall surface surrounding said second opening and a bolt axially aligned with said one end of said shaft and received in a threaded axial opening in said shaft one end to fixedly retain said shaft against said faced surface on said one substantially parallel wall portion.

6. A disk drive having an apparatus for securing a shaft between two substantially parallel wall portions comprising
   first securing means for securing one end of said shaft to one of said parallel wall portions,
   surface means defining an opening through the other of said wall portions which is substantially aligned with said shaft,
   second securing means for securing the end of said shaft opposite said one end to the other of said substantially parallel wall portions which includes a washer formed of one of a low yielding metal or an elastomeric material, adjacent the end of said shaft opposite said one end and within said opening, and
   retaining means secured to the end of said shaft opposite said one end that applies a force to said washer to expand said washer into engagement with said surface means, whereby said shaft is secured at each axial end without exerting a force which urges said parallel wall portions toward one another.

7. The apparatus of claim 6 wherein said shaft end opposite said one end has an axially aligned threaded opening therein and said retaining means comprises a bolt received in said threaded opening which compresses said washer between said bolt and the end of said shaft.

8. The apparatus of claim 7 wherein said second securing means comprises an annular slug surrounding the shank of said bolt with a peripheral frusto conical surface and said washer has an inner frusto conical surface that engages the slug peripheral conical surface.

* * * * *